United States Patent
Hsu et al.

(10) Patent No.: US 7,682,047 B2
(45) Date of Patent: Mar. 23, 2010

(54) BACKLIGHT MODULE WITH A HEAT DISSIPATION DEVICE

(75) Inventors: Nien-Hui Hsu, Hsinchu (TW); Ching-Po Lee, Hsinchu (TW)

(73) Assignee: Coretronic Corporation, Hsinchu (TW)

( * ) Notice: Subject to any disclaimer, the term of this patent is extended or adjusted under 35 U.S.C. 154(b) by 230 days.

(21) Appl. No.: 11/851,391

(22) Filed: Sep. 7, 2007

(65) Prior Publication Data
US 2008/0101065 A1  May 1, 2008

(30) Foreign Application Priority Data
Oct. 30, 2006  (TW) .............................. 95139970 A (51) Int. Cl.
*F21V 29/00*  (2006.01)
(52) U.S. Cl. .................. 362/294; 362/373; 362/97.1
(58) Field of Classification Search .................. 362/294, 362/559–561, 632–634, 580, 97.1–97.4, 362/218, 264, 345, 373, 547, 126
See application file for complete search history.

(56) References Cited

U.S. PATENT DOCUMENTS

| | | | | |
|---|---|---|---|---|
| 5,993,027 A * | 11/1999 | Yamamoto et al. | .......... | 362/294 |
| 7,259,964 B2 * | 8/2007 | Yamamura et al. | .......... | 361/697 |
| 7,273,310 B2 * | 9/2007 | Chen | .......... | 362/580 |
| 7,374,316 B2 * | 5/2008 | Kuo et al. | .......... | 362/373 |
| 7,445,356 B2 * | 11/2008 | Chen | .......... | 362/294 |
| 7,513,651 B2 * | 4/2009 | Chen | .......... | 362/294 |
| 7,527,401 B2 * | 5/2009 | Chen et al. | .......... | 362/373 |
| 7,527,409 B2 * | 5/2009 | Atarashi et al. | .......... | 362/613 |
| 2006/0072344 A1 * | 4/2006 | Kim et al. | .......... | 362/632 |
| 2006/0132699 A1 | 6/2006 | Cho et al. | | |

* cited by examiner

*Primary Examiner*—Bao Q Truong
(74) *Attorney, Agent, or Firm*—Jianq Chyun IP Office (57) ABSTRACT

A backlight module including a light box, a plurality of light source sets, and a heat dissipation device is provided. The light box has a bottom and a light-emitting section. The bottom has a first surface and a second surface opposite to the first surface. The light source sets are disposed on the first surface, and each of the light source sets includes a substrate disposed on the first surface and a plurality of point light sources disposed on the substrate. The heat dissipation device is disposed on the second surface. The heat dissipation device includes a thermal assembly and at least one fan, and the thermal assembly includes a plurality of covers. Each of the covers is individually disposed on the second surface at a position below one of the light source sets, and an air flow channel is formed between each cover and the bottom.

20 Claims, 7 Drawing Sheets

BACKLIGHT MODULE WITH A HEAT DISSIPATION DEVICE

CROSS-REFERENCE TO RELATED APPLICATION

This application claims the priority benefit of Taiwan application serial no. 95139970, filed Oct. 30, 2006. All disclosure of the Taiwan application is incorporated herein by reference.

BACKGROUND OF THE INVENTION

1. Field of Invention

The present invention relates to a plane light source device. More particularly, the present invention relates to a backlight module.

2. Description of Related Art

Figure 1A:
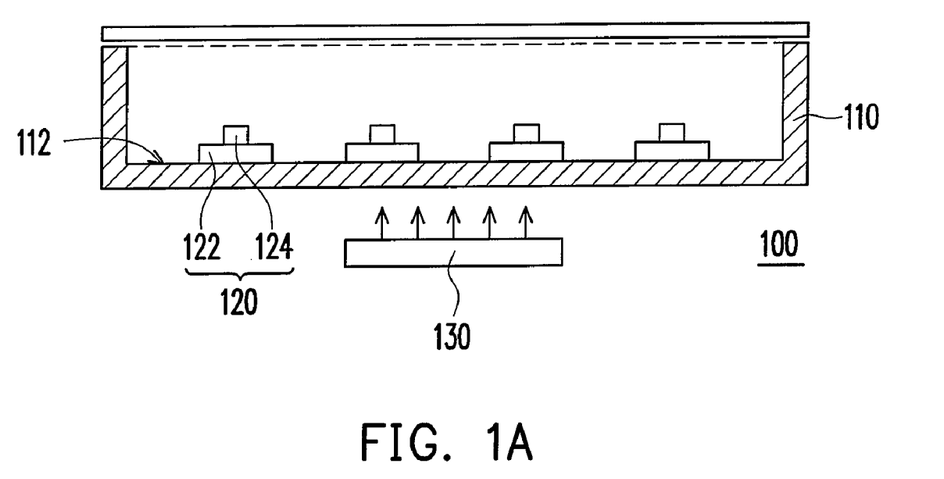
FIG. 1A is a schematic diagram of a conventional backlight module.
Figure 1B:
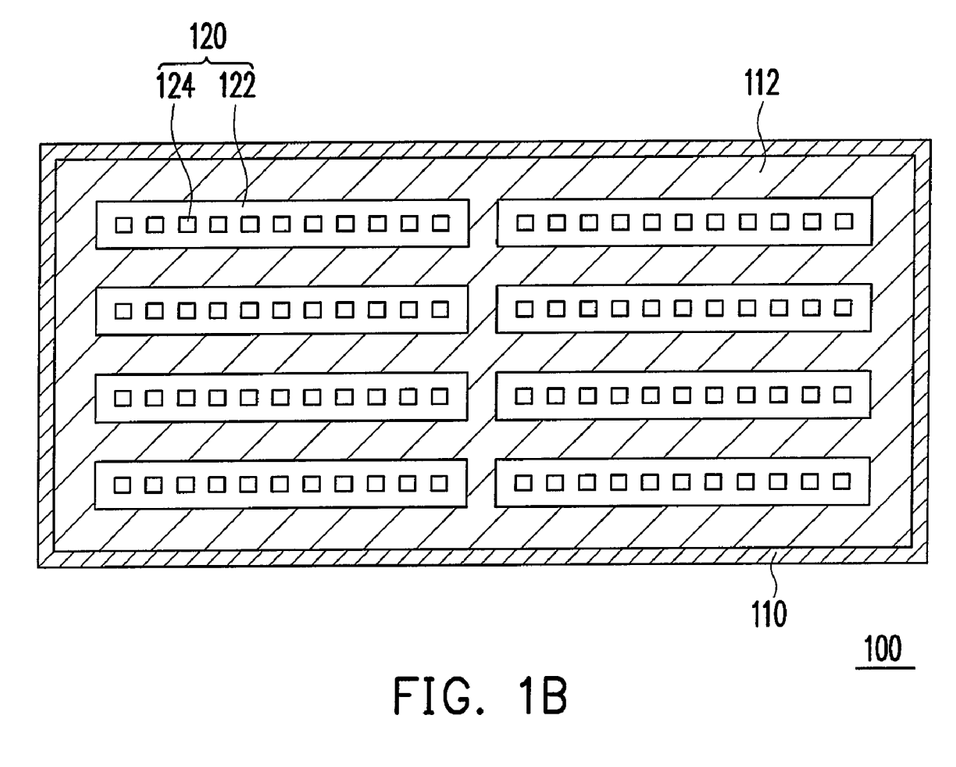
FIG. 1B is a top view of the backlight module of FIG. 1A.
Figure 2:
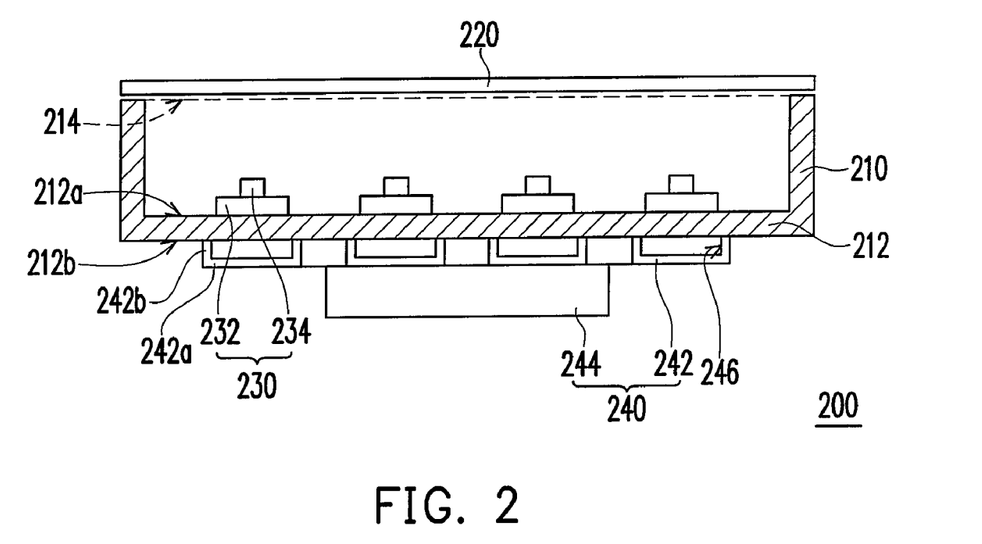
FIG. 2 is a schematic diagram of a backlight module of an embodiment of the present invention.

FIG. 1A is a schematic diagram of a conventional backlight module, and FIG. 1B is a top view of the backlight module of FIG. 1A. Referring to FIGS. 1A and 1B, a plurality of light source sets 120 is disposed on a bottom 112 of a light box 110 of a conventional backlight module 100. Each of the light source sets 120 includes a substrate 122 and a plurality of light-emitting diodes (LEDs) 124 disposed on the substrate 122. In the backlight module 100, the heat generated by the LEDs 124 is conducted to the bottom 112 of the light box 110 via the substrate 122. Conventionally, a fan 130 is used to generate a forced convection to reduce the temperature at the bottom 112 of the light box 110, so as to achieve the purpose of heat dissipation.

However, the air flow generated by the conventional fan 130 is capable of effectively reducing the temperature of a portion of the bottom 112 of the light box 110 near the fan 130 only, so the temperature of the rest portion of the bottom 112 of the light box 110 far away from the fan 130 is still quite high. In other words, the air flow generated by the fan 130 cannot effectively dissipate the heat of the entire bottom 112 of the light box 110, and the temperature at the bottom 112 of the light box 110 is not uniform. In addition, as the air flow generated by the fan 130 only reduces the temperature of a portion of the bottom 112 near the fan 130, a portion of the heat generated by the LEDs 124 cannot be effectively conducted to the external environment with the air flow generated by the fan 130 after being conducted to the bottom 112 of the light box 110. Therefore, the heat dissipation efficiency of the backlight module 100 is unsatisfactory, so the luminance of the LEDs 124 declines as the temperature increases, and color shift will occur as well. In another aspect, if the temperature difference of the LEDs in the entire backlight module is over high, the problem of uneven luminance will also occur.

SUMMARY OF THE INVENTION

The present invention is related to a backlight module, so as to reduce the problem of low heat dissipation efficiency of the conventional backlight module.

As embodied and broadly described herein, the present invention provides a backlight module, which includes a light box, a plurality of light source sets, and a heat dissipation device. The light box has a bottom and a light-emitting section opposite to the bottom, wherein the bottom has a first surface and a second surface opposite to the first surface, and the first surface is closer to the light-emitting section. The light source sets are disposed on the first surface or the second surface of the bottom, and each of the light source sets includes a substrate disposed on the first surface or the second surface and a plurality of point light sources disposed on the substrate. In addition, the heat dissipation device is disposed on the second surface of the bottom. The heat dissipation device includes a thermal assembly and at least one fan, wherein the thermal assembly includes a plurality of covers, each of the covers is individually disposed on the second surface at a position below one of the plurality of light source sets, and an air flow channel is formed between each cover and the bottom. Moreover, an end of each cover has a first opening, the other end has a second opening, and the second openings of the covers are communicated. The fan is disposed at the thermal assembly, and is suitable for making air in the air flow channels to flow out from the second openings, or making air to flow into the air flow channels from the second openings.

Based on the above description, a heat dissipation device is disposed on the second surface of the bottom of the light box, wherein the heat dissipation device includes a plurality of covers and at least one fan disposed near the covers, and each of the covers is individually disposed on the second surface at a position below one of the plurality of light source sets. An air flow channel is formed between each cover and the bottom, and the air flow generated by the fan flows along the air flow channels to effectively cool the light box, so as to prevent the light-emitting efficiency and light emitting wavelength from being influenced by over heat.

Other objectives, features and advantages of the present invention will be further understood from the further technology features disclosed by the embodiments of the present invention wherein there are shown and described preferred embodiments of this invention, simply by way of illustration of modes best suited to carry out the invention.

DESCRIPTION OF EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Referring to FIGS. 2, 3A, 3B, and 3C, the backlight module 200 of this embodiment includes a light box 210, a diffusion plate 220, a plurality of light source sets 230, and a heat dissipation device 240. The light box 210 has a bottom 212 and a light-emitting section 214 opposite to the bottom 212, and the diffusion plate 220 is disposed at the light-emitting section 214 of the light box 210. The bottom 212 has a first surface 212a and a second surface 212b opposite to the first surface 212a, and the first surface 212a is closer to the light-emitting section 214. The light source sets 230 are disposed on the bottom 212, i.e., the light source sets 230 are disposed on the first surface 212a or the second surface 212b of the bottom 212 (in this embodiment, the light source sets 230 are disposed on the first surface 212a of the bottom 212), and each of the light source sets 230 includes a substrate 232 and a plurality of point light sources 234. The substrate 232 is disposed on the bottom 212, and the point light sources 234 are disposed on the substrate 232 and face the light-emitting section 214. In this embodiment, the point light sources 234 are, for example, LEDs or other kinds of point light sources. In addition, the heat dissipation device 240 is disposed on the second surface 212b of the bottom 212. In this embodiment, the heat dissipation device 240 includes a thermal assembly and a fan 244. The thermal assembly includes a plurality of covers 242, each of the covers 242 is disposed on the second surface 212b at a position right below one of the light source sets 230, and an air flow channel 246 is formed between each cover 242 and the bottom 212. In this embodiment, an end of each cover 242 has a first opening 246a, and the other end has a second opening 246b. The second openings 246b of the covers 242 are communicated, and the fan 244 is disposed at the thermal assembly. In detail, for example, the plurality of covers 242 disposed right below the light source sets 230 are communicated to a cover 248, such that the second openings 246b of the covers 242 are communicated. A maximum distance between each of the covers 242 and the bottom 212 ranges, for example, from 1 mm to 10 mm. In this embodiment, for example, each of the covers 242 has a top surface 242a and two side surfaces 242b. The side surfaces 242b are connected between the top surface 242a and the bottom 212, and the maximum distance between the cover 242 and the bottom 212 is the distance from the top surface 242a to the bottom 212.

In the aforementioned backlight module 200, the covers 242 and the cover 248 can be one-piece integrated. The substrate 232 of the light source set 230 is, for example, strip-shaped, and the point light sources 234 are arranged along the extending direction of the substrate 232. The substrate 232 is, for example, a circuit board, and the material of the substrate 232 can be, but not limited to, a metal or an alloy with fine heat conductivity. In detail, the substrate 232 can be a metal core printed circuit board (MCPCB). Moreover, the material of the light box 210 can include, but is not limited to, aluminum or other metals or alloys with fine heat conductivity.

During the operation of the backlight module 200, the heat generated by the point light sources 234 is conducted to the substrate 232 first, and then to the bottom 212 of the light box 210 via the substrate 232, such that a portion of the bottom 212 of the light box 210 right below the substrate 232 is in a high-temperature state. The heat dissipation device 240 of this embodiment effectively reduces the temperature of the portion of the bottom 212 of the light box 210 right below the substrate 232, such that the bottom 212 of the light box 210 has fine heat dissipation efficiency and further the point light sources 234 remains at a normal working temperature. The heat dissipation device 240 of this embodiment will be illustrated in detail below.

In this embodiment, the fan 244 is, for example, disposed at a hole 248a of the cover 248. For example, the hole 248a is disposed at a position corresponding to the region where the heat source of the backlight module 200 concentrates. The fan 244 is, for example, an axial fan, which exhausts hot air in the air flow channels 246 to the external environment from the second openings 246b, and cool air in the external environment flows into the air flow channels 246 from the first openings 246a, thereby effectively reducing the temperature of the portion of the bottom 212 of the light box 210 right below the substrate 232. Therefore, compared with the conventional backlight module 100, the backlight module 200 of this embodiment has preferred heat dissipation efficiency, so the light emitting luminance of the point sources 234 will not decrease easily due to the over heat, and the light emitting wavelength will not easily vary.

Figure 3A:
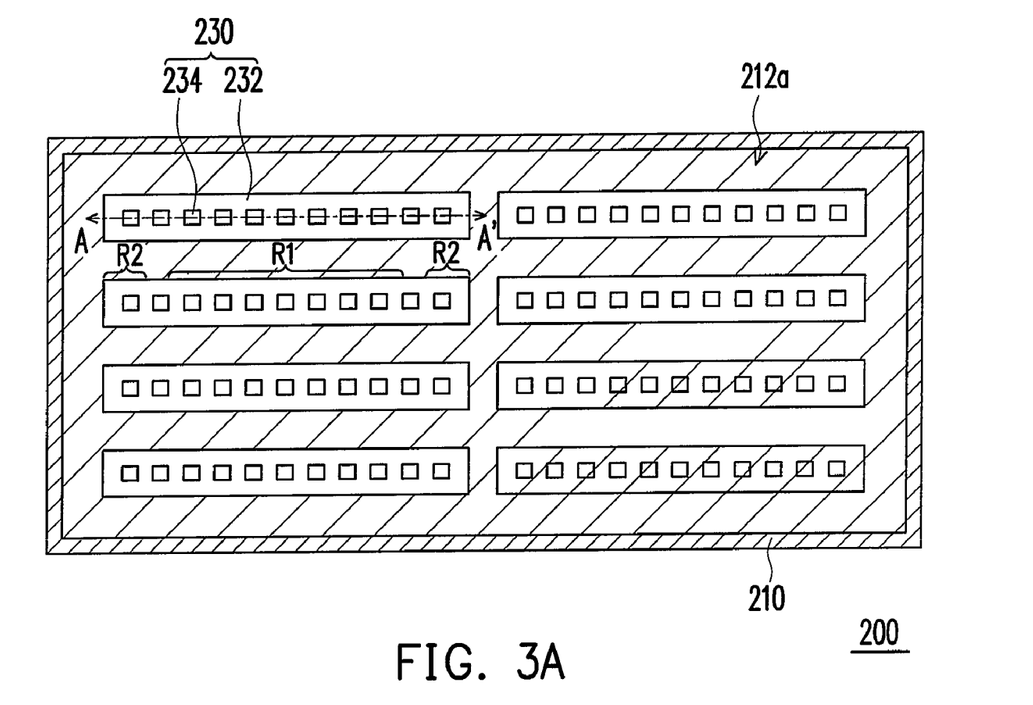
FIG. 3A is a top view of the light box and the light source sets of FIG. 2.
Figure 3B:
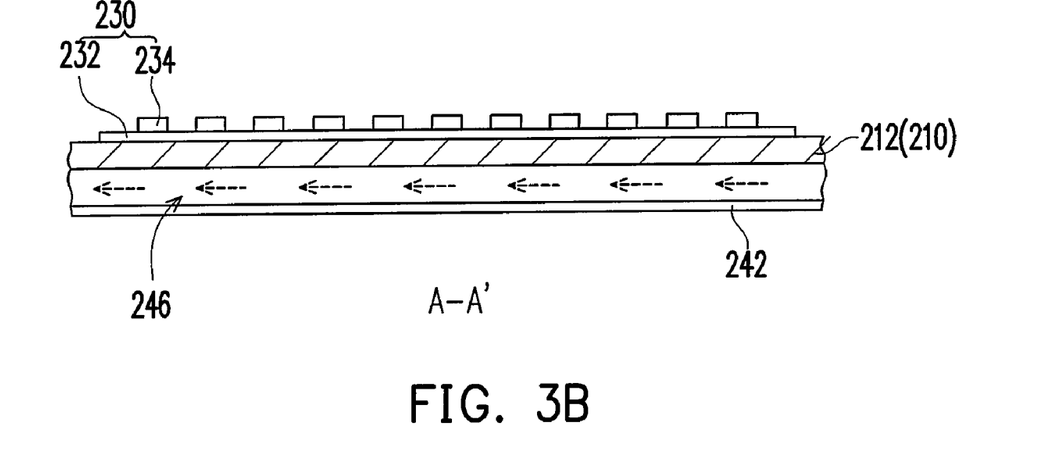
FIG. 3B is a cross-sectional view taken along line A-A' of FIG. 3A.
Figure 3C:
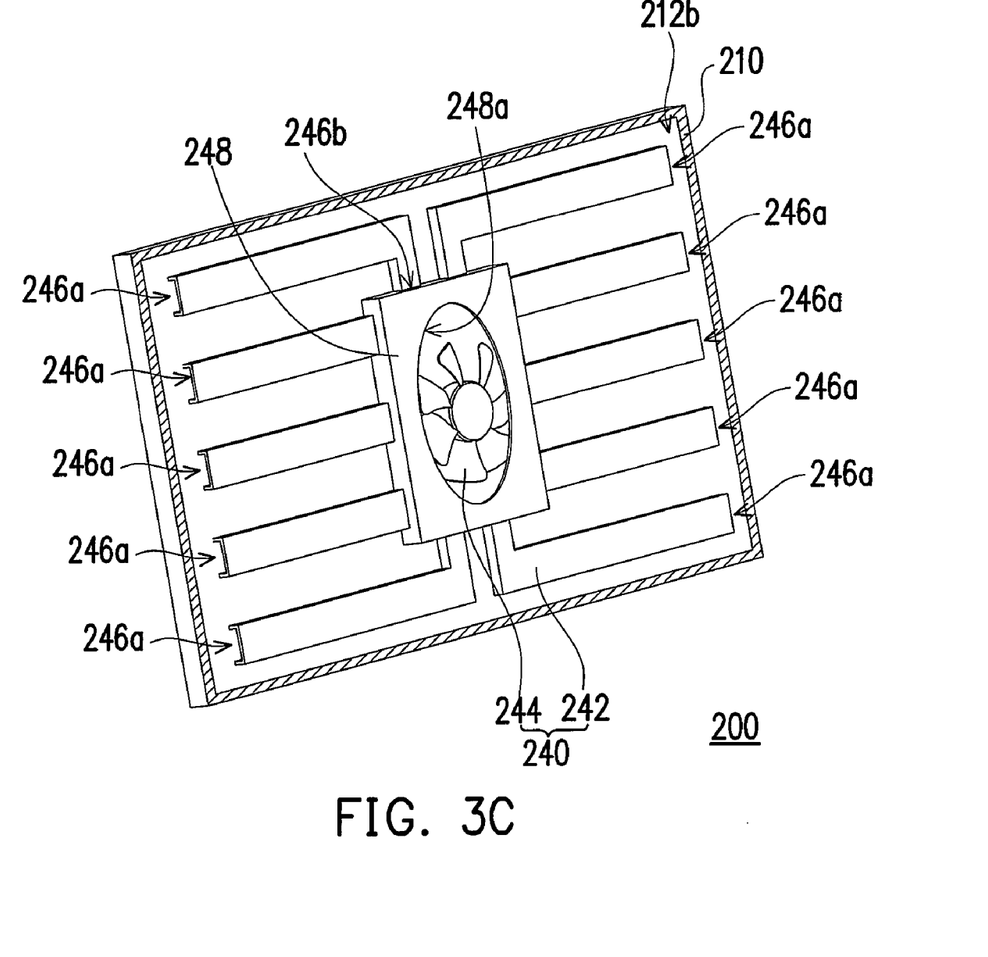
FIG. 3C is a stereogram of the covers and the bottom of the light box in FIG. 2 jointed together.
Figure 4:
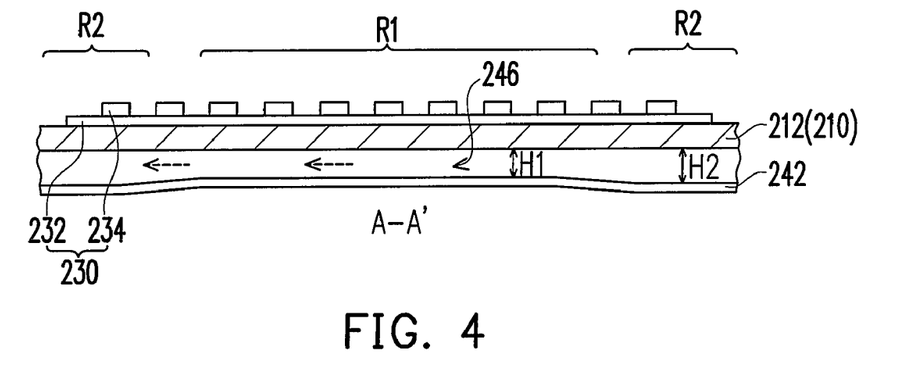
FIG. 4 is a cross-sectional view of FIG. 3B after the distance between a portion of the covers and the bottom is adjusted.

Moreover, after the light source sets 230 operate for a period of time, the temperature of the central portion R1 of each of the light source sets 230 is often higher than the temperature of two end portions R2 of each of the light source sets 230, resulting in a large temperature difference between the point light sources 234 on the substrate 232 and leading to uneven luminance. In order to solve the problem that the temperature of the central portion R1 of the light source sets 230 is over high, the present invention provides a preferred embodiment. FIG. 4 is a cross-sectional view of FIG. 3B after the distance between a portion of the covers and the bottom is adjusted. In this embodiment, the maximum distance H1 between each of the cover 242 corresponding to the central portion R1 of the light source set 230 and the bottom 212 is smaller than the maximum distance H2 between each of the cover 242 corresponding to two end portions R2 of the light source set 230 and the bottom 212, such that the air flow flows faster in the air flow channels 246 corresponding to the central portions R1, and more heat is dissipated. In particular, the mass velocity of the air flow in the air flow channel 246 is a fixed value. As the mass velocity=density×velocity×cross-section area, when the air flows through the portion with a smaller cross-section area of the air flow channel 246, the velocity of the air flow is higher. In this embodiment, as the distance H1 is smaller than the distance H2, the cross-section area of the air flow channel 246 corresponding to the central portion R1 is smaller than the cross-section area of the air flow channel 246 corresponding to two end portions R2. Therefore, the velocity of the air flow is higher when flowing through the air flow channel 246 corresponding to the central portion R1, i.e., more heat is dissipated in the same period of time, and thus the heat dissipation efficiency of the central portion R1 of the light source sets 230 is improved. In addition, in this embodiment, a plurality of holes (not shown) can be opened in the covers 242 to adjust the intake air distribution of the air flow channels 246.

Figure 5A:
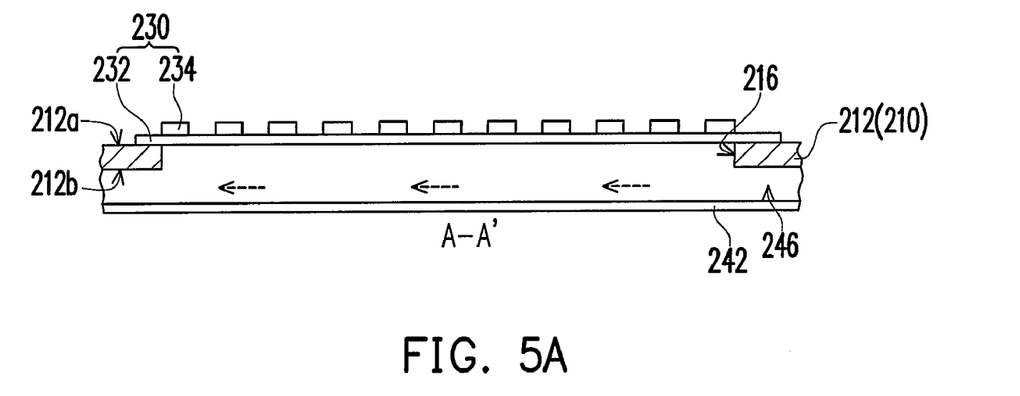
FIG. 5A is a cross-sectional view of the light box of FIG. 3B provided with the heat dissipation holes.
Figure 5B:
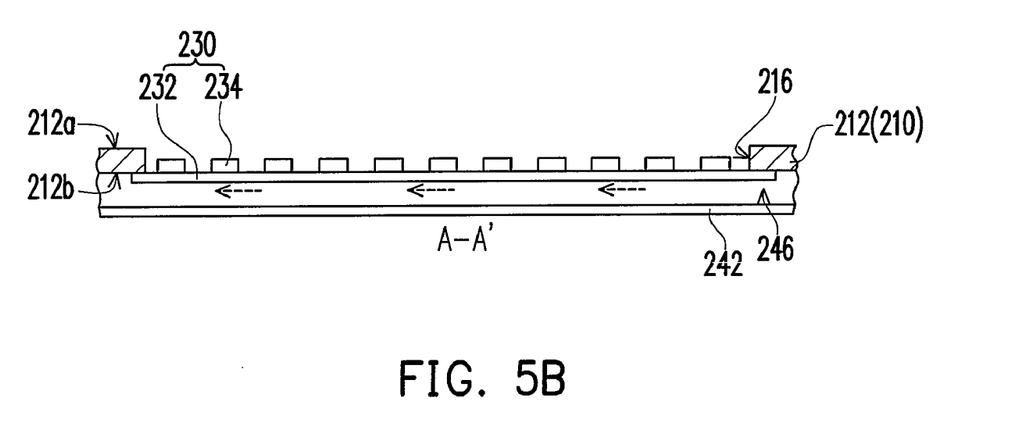
FIG. 5B is a cross-sectional view of the light source sets of the FIG. 5A that are disposed on the other side of the heat dissipation holes.

In another embodiment of the present invention, a heat dissipation hole 216 is arranged in the bottom 212 of the light box 210 at a position right below each of the light source sets 230 (as shown in FIG. 5A, in which a cross-sectional view of the light box of FIG. 3B with the heat dissipation holes is shown). Each of the heat dissipation holes 216 exposes the corresponding portion of substrate 232, such that the air flow in the air flow channels directly dissipates the heat of the substrates 232, thereby improving the heat dissipation efficiency of the light source sets 230. In another preferred embodiment, the light source sets 230 can also be disposed on the other side of the heat dissipation holes 216 (see FIG. 5B, which is a cross-sectional view of the light source sets 230 disposed on the other side of the heat dissipation holes 216), i.e., the light source sets 230 are disposed on the second surface 212b of the bottom 212.

Figure 6:
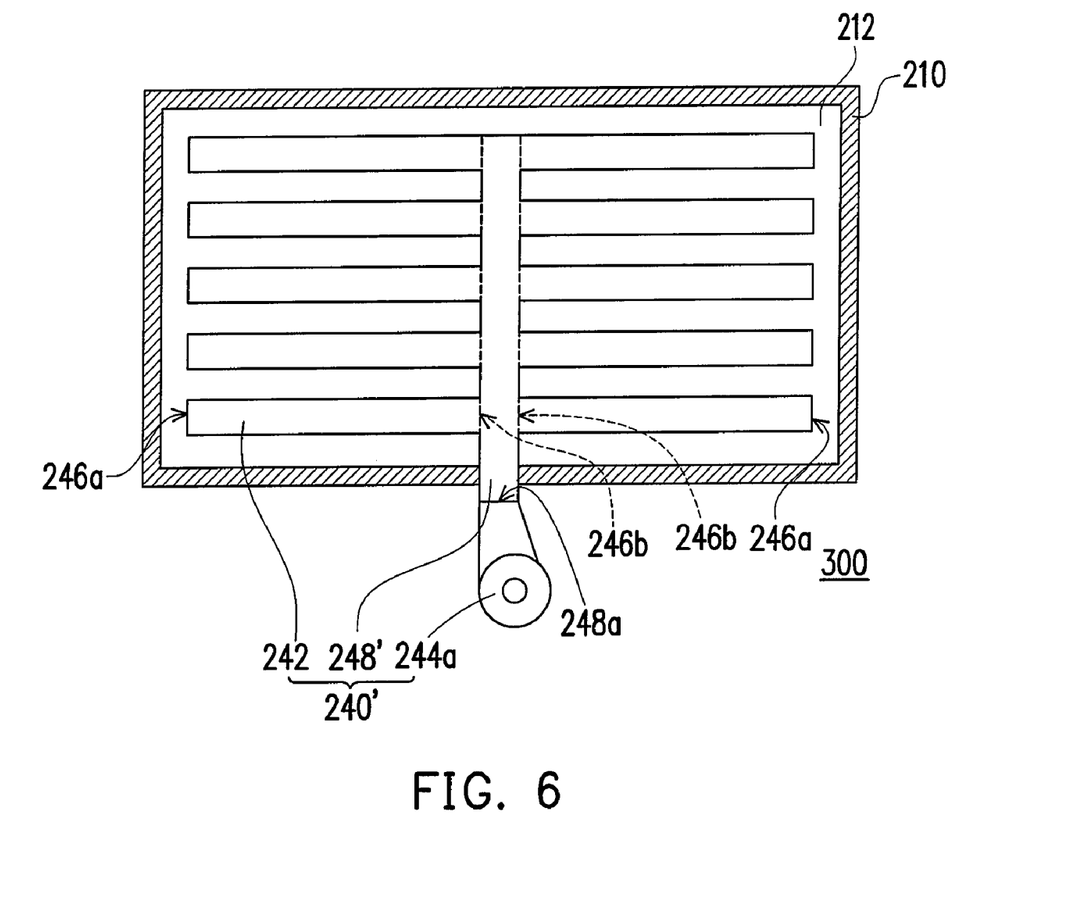
FIG. 6 is a bottom view of another backlight module according to an embodiment of the present invention.
Figure 7:
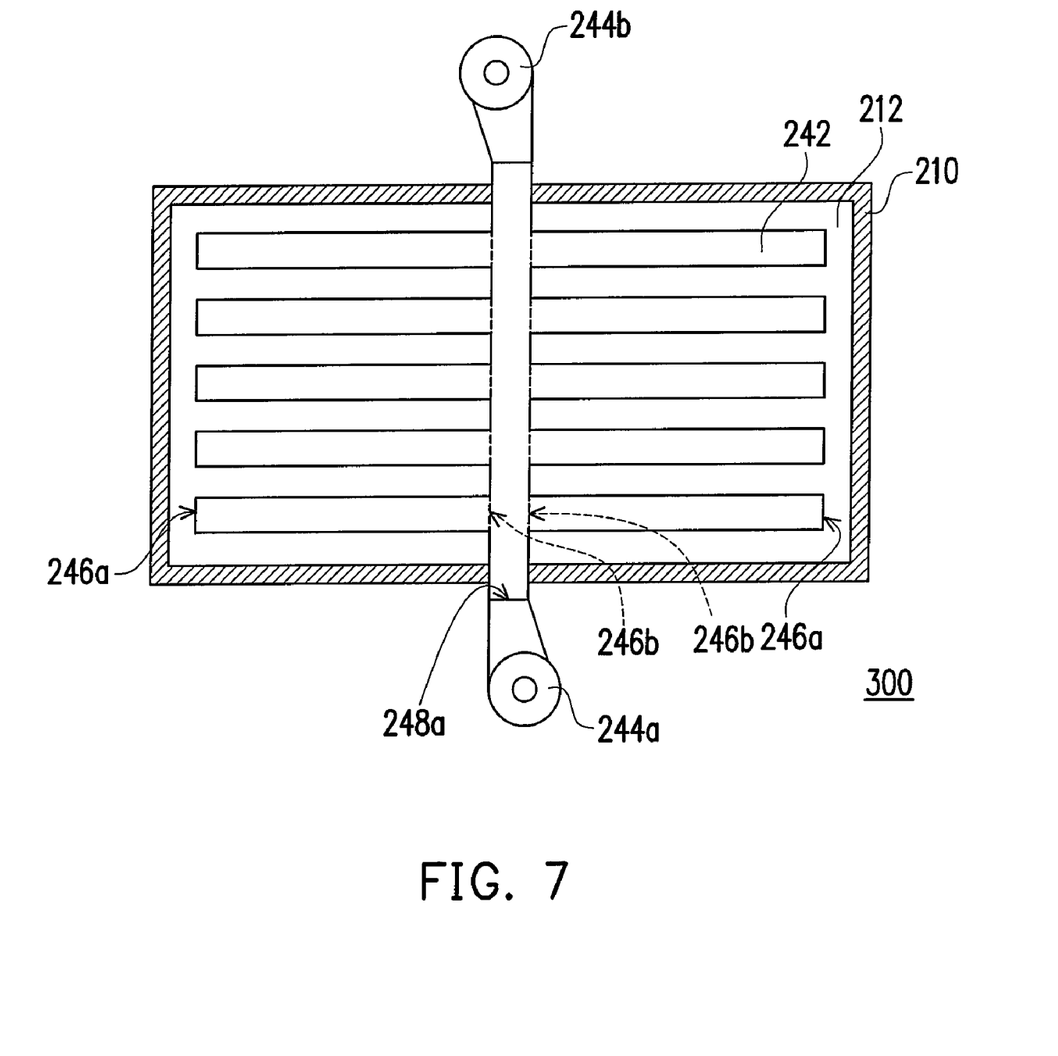
FIG. 7 is a schematic diagram of the backlight module of FIG. 6 with an additional blower.

FIG. 6 is a bottom view of another backlight module according to an embodiment of the present invention. Referring to FIG. 6, the backlight module 300 of this embodiment is similar to the backlight module 200 described above, while the main difference is the heat dissipation device. In detail, the covers 242 of the heat dissipation device 240' of the backlight module 300 are connected to a cover 248', such that the second openings 246b of the covers 242 are communicated. In addition, the fan 244a is a blower disposed at an hole 248a of the cover 248. The air flow generated by the fan 244a enters the air flow channels from the second openings 246b, so as to cool the light source sets 230. Then, the air flow flows out of the air flow channels from the first openings 246a. Moreover, in this embodiment, an additional blower 244b can be further disposed into the backlight module 300 (as shown in FIG. 7, which is a schematic diagram of the backlight module of FIG. 6 with an additional blower). Thus, the blowers 244a and 244b work together to generate a larger amount of air flow to reduce the temperature of the light source sets 230 more effectively.

Figure 8:
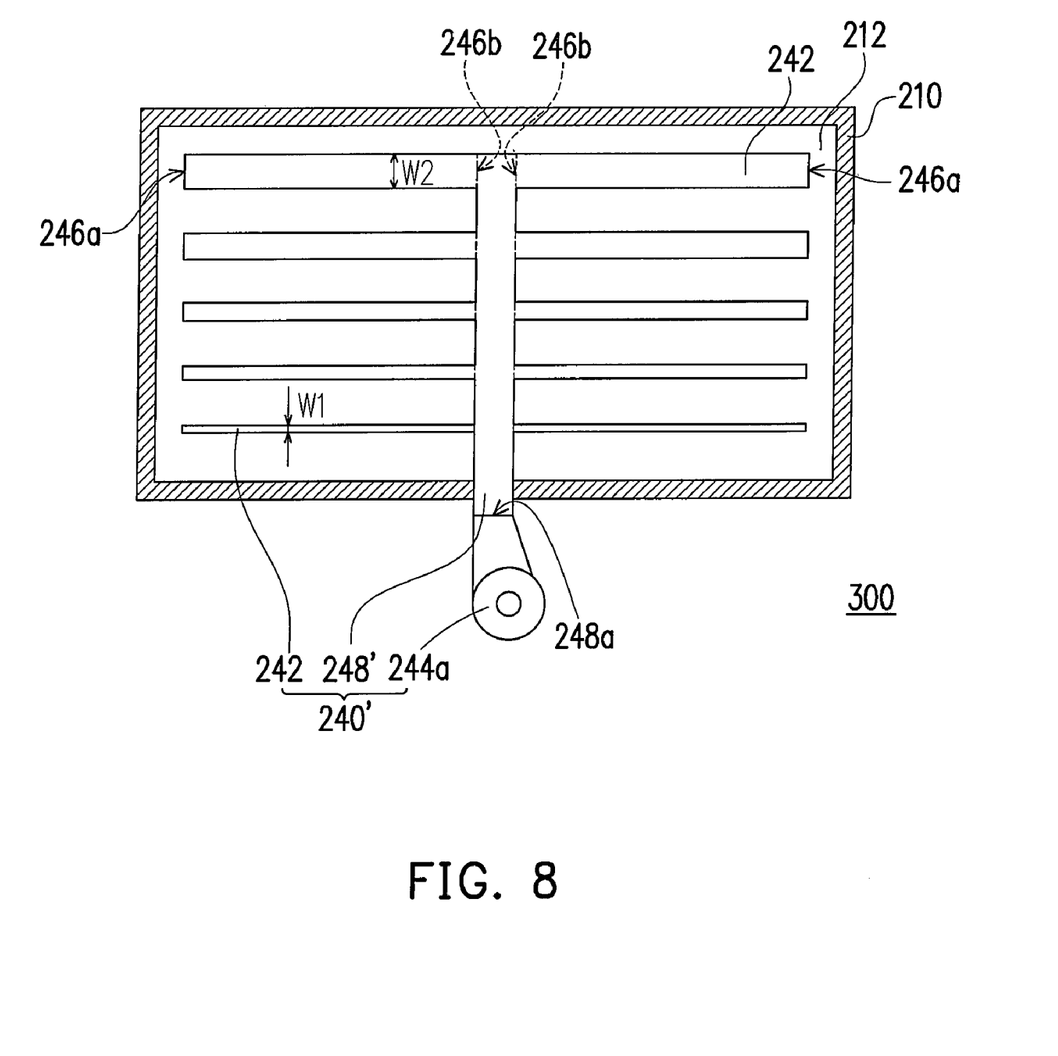
FIG. 8 is a schematic diagram of the backlight module of FIG. 6 with the width of the air flow channels being changed.

Referring to FIG. 8, in this embodiment, the mass velocity of the air flow generated by the fan 244a is a fixed value, i.e., the mass velocity of the air flow generated by the fan 244a equals to the sum of the air amount of various air flow channels. Therefore, in order to provide enough amount of air to dissipate the heat of the light source sets 230 far away from the hole 248a, the width of a portion of the covers 242 is adjusted in this embodiment, so as to change the cross-section area of the air flow channels formed between the covers 242 and the bottom 212. In particular, in this embodiment, the width of the covers 242 closer to the hole 248a is smaller than the width of the covers 242 far away from the hole 248a. In other words, the width W1 of the cover 242 closest to the hole 248a is the minimum, and the width W2 of the cover 242 farthest from the hole 248a is the maximum. Thus, more air can flow into the portion of the air flow channels far away from the hole 248a, such that the heat dissipation efficiency of the heat dissipation device 240' to various light source sets 230 is even.

To sum up, according to the present invention, a heat dissipation device is disposed on the second surface of the bottom of the light box, wherein the heat dissipation device includes a plurality of covers and at least one fan disposed near the covers, and the covers are individually disposed on the second surface at a position below one of the plurality of light source sets. An air flow channel is formed between each cover and the bottom, and the air flow generated by the fan can flow along the air flow channels to effectively cool the light source sets. In addition, the present invention can adjust the width of the covers to ensure that the even heat dissipation efficiency of the heat dissipation device to the light source sets. Moreover, by arranging a plurality of additional heat dissipation holes at the bottom of the light box appropriately, the air flow cools the substrate directly, which facilitates reducing the temperature of the light source sets. Compared with the conventional backlight module, the backlight module of the present invention has better heat dissipation efficiency, so the luminance of the point light sources will not decrease easily due to the over heat, and the light emitting wavelength of the point light sources does not easily change due to over heat. Meanwhile, the uniform temperature distribution can be realized by adjusting the covers. Therefore, the backlight module of the present invention provides a plane light source with uniform luminance and stable colors.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A backlight module, comprising:
a light box, having a bottom and a light-emitting section opposite to the bottom, wherein the bottom has a first surface and a second surface opposite to the first surface, and the first surface is closer to the light-emitting section;
a plurality of light source sets, disposed on the bottom, wherein each of the light source sets comprises a substrate disposed on the bottom and a plurality of point light sources disposed on the substrate;
a heat dissipation device, comprising:
a thermal assembly including a plurality of first covers and a second cover, wherein each of the first covers is disposed on the second surface at a position below one of the light source sets, an air flow channel is formed between each of the first covers and the bottom, an end of each of the first covers has a first opening, the other end of each of the first covers has a second opening, the second cover has a hole, the first covers are connected to and communicate with the second cover, and the second openings communicate with each other through the second cover; and
at least one fan, disposed at the thermal assembly and at the hole of the second cover, wherein the fan makes air in the air flow channels to flow out from the second openings, or the fan makes the air to flow into the air flow channels from the second openings.

2. The backlight module as claimed in claim 1, wherein the bottom has a plurality of heat dissipation holes, and each of the heat dissipation holes exposes a corresponding portion of the substrate.

3. The backlight module as claimed in claim 1, wherein a maximum distance between the first covers and the bottom ranges from 1 mm to 10 mm.

4. The backlight module as claimed in claim 1, wherein the fan is an axial fan.

5. The backlight module as claimed in claim 1, wherein the fan is a blower.

6. The backlight module as claimed in claim 1, wherein the point light sources are light-emitting diodes.

7. The backlight module as claimed in claim 1, wherein the first covers have a plurality of holes.

8. The backlight module as claimed in claim 1, wherein a maximum distance between each of the first covers corresponding to a central portion of each of the light source sets and the bottom is smaller than a maximum distance between each of the first covers corresponding to two end portions of each of the light source sets and the bottom.

9. The backlight module as claimed in claim 1, further comprising a diffusion plate disposed at the light-emitting section of the light box.

10. The backlight module as claimed in claim 1, wherein each of the first covers is disposed on the second surface at a position right below one of the light source sets.

11. The backlight module as claimed in claim 1, wherein the first covers and the second cover are one-piece integrated.

12. A backlight module, comprising:
a light box, having a bottom and a light-emitting section opposite to the bottom, wherein the bottom has a first surface and a second surface opposite to the first surface, and the first surface is closer to the light-emitting section;
a plurality of light source sets, disposed on the bottom, wherein each of the light source sets comprises a substrate disposed on the bottom and a plurality of point light sources disposed on the substrate;
a heat dissipation device, comprising:
a thermal assembly, including a plurality of covers, wherein each of the covers is disposed on the second surface at a position below one of the light source sets, an air flow channel is formed between each of the covers and the bottom, an end of each of the covers has a first opening, the other end of each of the covers has a second opening, and the second openings are communicated, and wherein a maximum distance between each of the covers corresponding to a central portion of each of the light source sets and the bottom is smaller than a maximum distance between each of the covers corresponding to two end portions of each of the light source sets and the bottom; and
at least one fan, disposed at the thermal assembly, wherein the fan makes air in the air flow channels to flow out from the second openings, or the fan makes the air to flow into the air flow channels from the second openings.

13. The backlight module as claimed in claim 12, wherein the bottom has a plurality of heat dissipation holes, and each of the heat dissipation holes exposes a corresponding portion of the substrate.

14. The backlight module as claimed in claim 12, wherein a maximum distance between the covers and the bottom ranges from 1 mm to 10 mm.

15. The backlight module as claimed in claim 12, wherein the fan is an axial fan.

16. The backlight module as claimed in claim 12, wherein the fan is a blower.

17. The backlight module as claimed in claim 12, wherein the point light sources are light-emitting diodes.

18. The backlight module as claimed in claim 12, wherein the covers have a plurality of holes.

19. The backlight module as claimed in claim 12, further comprising a diffusion plate disposed at the light-emitting section of the light box.

20. The backlight module as claimed in claim 12, wherein each of the covers is disposed on the second surface at a position right below one of the light source sets.

* * * * *